United States Patent
Seeburger et al.

[15] 3,655,522

[45] Apr. 11, 1972

[54] PURIFICATION OF PHENYLPHENOL FROM DIBENZOFURAN BY AZEOTROPIC DISTILLATION

[72] Inventors: Harold O. Seeburger; Lee H. Horsley, both of Midland, Mich.

[73] Assignee: The Dow Chemical Company, Midland, Mich.

[22] Filed: Nov. 9, 1970

[21] Appl. No.: 88,101

[52] U.S. Cl. .....................203/59, 203/64.91, 260/346.2 M, 260/620
[51] Int. Cl. ......................................B01d 3/36, C07c 39/12
[58] Field of Search.................203/59, 64, 91; 260/346.2 M, 260/620

[56] References Cited

UNITED STATES PATENTS

| | | | |
|---|---|---|---|
| 1,907,246 | 5/1933 | Hale et al. | 260/620 |
| 2,050,815 | 8/1936 | Stoesser | 260/620 |
| 3,108,121 | 10/1963 | Walsh et al. | 260/346.2 M |
| 3,169,149 | 2/1965 | Walsh et al. | 260/620 |

*Primary Examiner*—Wilbur L. Bascomb, Jr.
*Attorney*—Griswold & Burdick, D. H. Thurston and Richard W. Hummer

[57] ABSTRACT

Dibenzofuran is separated from a mixture with ortho- or para-phenylphenol, or a mixture thereof, by an azeotropic distillation utilizing an azeotropic agent which is a glycol, glycol monoalkyl ether, alkanolamine, or dialkylenetriamine having an appropriate boiling point.

6 Claims, No Drawings

PURIFICATION OF PHENYLPHENOL FROM DIBENZOFURAN BY AZEOTROPIC DISTILLATION

BACKGROUND OF THE INVENTION

In the preparation of phenol, o-phenylphenol, and p-phenylphenol by the caustic hydrolysis of chlorobenzene, some dibenzofuran is formed. Separation of the dibenzofuran, with a boiling point of 288° C., from o-phenylphenol (bp 275° C.) and/or p-phenylphenol (bp 305° C.) is difficult to achieve by simple distillation since the respective boiling points are so close together, and the separation is cumbersome and relatively expensive to accomplish by caustic extraction. These difficulties have led to a search for a convenient and effective method of separating dibenzofuran from the phenylphenols.

SUMMARY OF THE INVENTION

The essential and novel feature of the present invention is the separation of dibenzofuran from ortho- or para-phenylphenol, or a mixture thereof, by use of particular azeotropic agents. Thus, dibenzofuran is separated from a mixture with ortho- or para-phenylphenol, or a mixture thereof, by adding to the mixture of these compounds an azeotropic agent which is a lower alkylene glycol, lower alkylene glycol monoalkyl ether, alkanolamine, or di-lower-alkylenetriamine of appropriate boiling point, and then fractionally distilling the dibenzofuran azeotrope from the mixture thus formed under conditions whereby substantial thermal decomposition is avoided.

DETAILED DESCRIPTION

Appropriate azeotropic agents have atmospheric boiling points within the range from about 238° C. to about 288° C., with those having atmospheric boiling points of about 240°–260° C. being preferred.

Representative azeotropic agents are lower alkylene glycols where the alkylene groups are of two to four carbon atoms, such as diethylene glycol, dibutylene glycol, triethylene glycol and tripropylene glycol; lower alkylene glycol monoalkyl ethers, wherein the alkyl radical is from one to four carbon atoms, such as triethylene glycol monomethyl ether, triethylene glycol mono-n-butyl ether, and tripropylene glycol monomethyl ether; di-lower-alkylenetriamines, such as dipropylenetriamine; 1,2,3-butanetriol; and lower alkanolamines, wherein the N-hydroxyalkyl substituent is from two to four carbon atoms, such as diethanolamine, diisopropanolamine, and 2-aminoethylethanolamine. Particularly preferred agents are diethylene glycol, triethylene glycol monomethyl ether, diisopropanolamine, and dipropylenetriamine.

After the azeotropic agent is added to the impure phenylphenol, the distillation of the mixture is conducted at any pressure, the only limitation being that the distillation temperature should not be so high as to cause substantial thermal decomposition of the compounds. Subatmospheric pressures are preferable to avoid excessively high temperatures.

The comparative concentrations of the phenylphenol(s) and dibenzofuran may vary widely. Essentially, the mixture can be of any proportion. However, when a large amount of dibenzofuran is present, it may be advantageous to conduct a preliminary simple distillation so as to concentrate the phenylphenol(s) to about 95 weight percent or greater, and then use the azeotropic process to provide the more difficult final purification.

The quantity of azeotropic agent employed is preferably just sufficient to remove the impurity. Insufficient agent results in incomplete purification. Excess reagent does no harm except to require extra and unnecessary distillation to remove it. The amount of azeotropic agent required is dependent on the amount of dibenzofuran in the mixture, the azeotropic agent employed, the operating pressures of distillation, and the apparatus used in the distillation. The optimum amount of azeotropic agent for a particular system is best determined by experience using these factors as a guide.

The process of the present invention is conveniently adapted to either a batch or preferably a continuous flow operation. In a continuous flow operation, the crude phenylphenol(s)-dibenzofuran mixture is pumped into a distillation column at an appropriate feed point dependent on its composition. Sufficient azeotropic agent is fed into the column to maintain the agent in the upper two-thirds of the column length during the distillation. The dibenzofuran and azeotropic agent are collected as the distillate, and the residue contains the phenylphenol(s).

Since many of the azeotropic agents of the present invention are at least partially insoluble in the dibenzofuran, the distillate usually will form two phases. This phenomenon can be advantageously used in the continuous flow operation because this easy separation permits convenient return of the azeotropic agent layer to the distillation.

DESCRIPTION OF PREFERRED EMBODIMENTS

Example 1: Separation of Dibenzofuran from o-Phenylphenol

A mixture containing 98 percent by weight of o-phenylphenol and 2 percent by weight of dibenzofuran was distilled by use of a 1 ⅛ × 30 distillation column packed with ¼ ceramic Berl saddles equivalent to four to five theoretical plates. A regulated reflux ratio of 5:1 was used and the pressure was maintained at 50 mm. Hg absolute. 6.9 percent by weight of the total aromatics was removed by distillation, giving a residue which analyzed as 98.9 percent by weight of o-phenylphenol and 1.1 percent by weight of dibenzofuran.

The above distillation was repeated under identical conditions, except for the addition of an azeotropic agent to the o-phenylphenol-dibenzofuran mixture in such amount as to give a distillation mixture which was 73.5 weight percent o-phenylphenol (o-PP), 1.5 weight percent dibenzofuran (DBF) and 25.0 weight percent azeotropic agent. Table 1 summarizes the azeotropic agents employed and the composition of the residue as expressed in weight percent of total aromatics exclusive of the excess azeotropic agent remaining.

TABLE 1

| Azeotropic Agent | Weight % of Aromatics Removed by Distillation | Composition of Residue o-PP | DBF |
|---|---|---|---|
| Diethylene glycol | 2.5 | 100.0 | 0 |
| Diethylene glycol | 1.75 | 100.0 | 0 |
| Triethylene glycol monomethyl ether | 0.53 | 99.4 | 0.6 |
| Diisopropanolamine | 1.6 | 100.0 | 0 |
| Dipropylenetriamine | 0.5 | 99.3 | 0.7 |

Example 2: Separation of Dibenzofuran from p-Phenylphenol

Distillation in the same manner as outlined in Example 1 of a mixture of 65.33 weight percent of p-phenylphenol, 1.33 weight percent dibenzofuran, and 33.33 weight percent of diethylene glycol gave a residue, after removal of 1.6 weight percent of the aromatics, which was 100.0 weight percent p-phenylphenol, exclusive of excess azeotropic agent remaining.

Example 3: Effect of Pressure on an Azeotropic System

Distillations were run on the same o-phenylphenol-dibenzofuran-diethylene glycol mixture used in Example 1 under identical distillation conditions except that the pressure was varied. The data are summarized in Table 2.

TABLE 2

| Pressure (mm. Hg) | Weight % of Aromatics Removed by Distillation | Composition of residue o-pp | DBF |
|---|---|---|---|
| 12 | 2.3 | 99.9 | <0.1 |
| 50 | 1.75 | 100.0 | 0 |

| 200 | 1.98 | 99.7 | 0.3 |
| 350 | 1.87 | 99.9 | 0.1 |
| atmospheric | 1.39 | 99.5 | 0.5 |

To remove dibenzofuran from a mixture of ortho- and para-phenylphenol, the azeotropic agent is added and the distillation conducted in the manner outlined in Example 1. The residue then is a mixture of the ortho and para-isomers and any excess agent, and simple distillation separates these compounds.

When the azeotropic agent used in the foregoing examples is replaced by a similar amount of dibutylene glycol, triethylene glycol, tripropylene glycol, triethylene glycol mono-n-butyl ether, tripropylene glycol monomethyl ether, 1,2,3-butanetriol, diethanolamine, or-N-(2-aminoethyl)ethanolamine and the mixture is distilled as shown above, dibenzofuran is separated from the phenylphenol with comparable efficiency.

We claim:

1. A method for separating dibenzofuran from a mixture with o-phenylphenol, p-phenylphenol, or a mixture of these phenols, which comprises adding to the mixture of the dibenzofuran and the phenylphenol an azeotropic agent selected from the group consisting of 1,2,3-butanetriol, lower alkylene glycol, lower alkylene glycol monoalkyl ether, di-lower-alkylenetriamine, or lower alkanolamine, said agent having an atmospheric boiling point within the range from about 238° C. to about 288° C., and then fractionally distilling dibenzofuran-azeotropic agent azeotrope from the mixture thus formed.

2. The method of claim 1 wherein the azeotropic agent has a boiling point of about 240–260° C. at atmospheric pressure.

3. The process of claim 2 wherein the azeotropic agent is diethylene glycol, triethylene glycol monomethyl ether, diisopropanolamine, or dipropylenetriamine.

4. The process of claim 3 wherein dibenzofuran is separated from o-phenylphenol.

5. The process of claim 3 wherein dibenzofuran is separated from p-phenylphenol.

6. The method of claim 1 wherein the fractional distillation is conducted at subatmospheric pressure.

* * * * *